United States Patent
Kim

(10) Patent No.: US 11,486,462 B2
(45) Date of Patent: Nov. 1, 2022

(54) HYDRAULIC MOUNT

(71) Applicants: HYUNDAI MOTOR COMPANY, Seoul (KR); KIA MOTORS CORPORATION, Seoul (KR)

(72) Inventor: Seung Won Kim, Seoul (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 139 days.

(21) Appl. No.: 17/119,218

(22) Filed: Dec. 11, 2020

(65) Prior Publication Data

US 2022/0010858 A1 Jan. 13, 2022

(30) Foreign Application Priority Data

Jul. 8, 2020 (KR) .................... 10-2020-0084126

(51) Int. Cl.
*F16F 15/023* (2006.01)
*F16F 13/14* (2006.01)
(Continued)

(52) U.S. Cl.
CPC ............ *F16F 15/023* (2013.01); *B60K 17/00* (2013.01); *F16F 13/1409* (2013.01);
(Continued)

(58) Field of Classification Search
CPC .... F16F 13/14; F16F 13/1409; F16F 13/1427; F16F 13/1463; F16F 13/1481;
(Continued)

(56) References Cited

U.S. PATENT DOCUMENTS 4,728,086 A * 3/1988 Ishiyama ................ F16F 13/20
267/141.2
6,070,862 A * 6/2000 Miyamoto .......... F16F 13/1418
267/140.12
(Continued)

FOREIGN PATENT DOCUMENTS

DE 3722079 C2 * 9/1996 .............. F16F 13/14
JP 2623013 B2 * 6/1997 .......... F16F 13/1418
(Continued)

*Primary Examiner* — Thomas J Williams
(74) *Attorney, Agent, or Firm* — Morgan, Lewis & Bockius LLP

(57) ABSTRACT

A hydraulic mount includes: an outer pipe having a diaphragm defined thereon by vulcanization; a main rubber member disposed in the outer pipe by press-fitting; a core disposed inside the main rubber member; a ring stopper interposed between the diaphragm and the main rubber member; a first fluid chamber and a second fluid chamber configured by depressing both sides of an outer circumference of the main rubber member towards the core, each of the first and second fluid chambers configured to accommodate a fluid; a third fluid chamber configured to communicate with the first fluid chamber and the second fluid chamber, disposed in a part of the main rubber member under the core, and accommodating the fluid; and a fourth fluid chamber configured to communicate with the third fluid chamber and disposed between the ring stopper and the outer pipe to accommodate the fluid.

18 Claims, 19 Drawing Sheets

(51) Int. Cl.
*B60K 5/12* (2006.01)
*B60K 17/00* (2006.01)

(52) U.S. Cl.
CPC ...... *F16F 13/1418* (2013.01); *F16F 13/1427* (2013.01); *F16F 13/1463* (2013.01); *F16F 13/1481* (2013.01); *F16F 2222/12* (2013.01)

(58) Field of Classification Search
CPC ...... F16F 13/1418; F16F 15/023; B60K 5/12; B60K 5/1208
USPC ........................................ 267/140.11, 140.12
See application file for complete search history.

(56) References Cited

U.S. PATENT DOCUMENTS

2009/0189323 A1* 7/2009 Endo .................. F16F 13/1409
 267/140.12
2022/0010858 A1* 1/2022 Kim ................... F16F 13/1427

FOREIGN PATENT DOCUMENTS

| | | | |
|---|---|---|---|
| JP | 10331904 A * | 12/1998 | ............ B60G 3/202 |
| KR | 10-1237928 B1 | 2/2013 | |
| KR | 10-1256860 B1 | 4/2013 | |

* cited by examiner

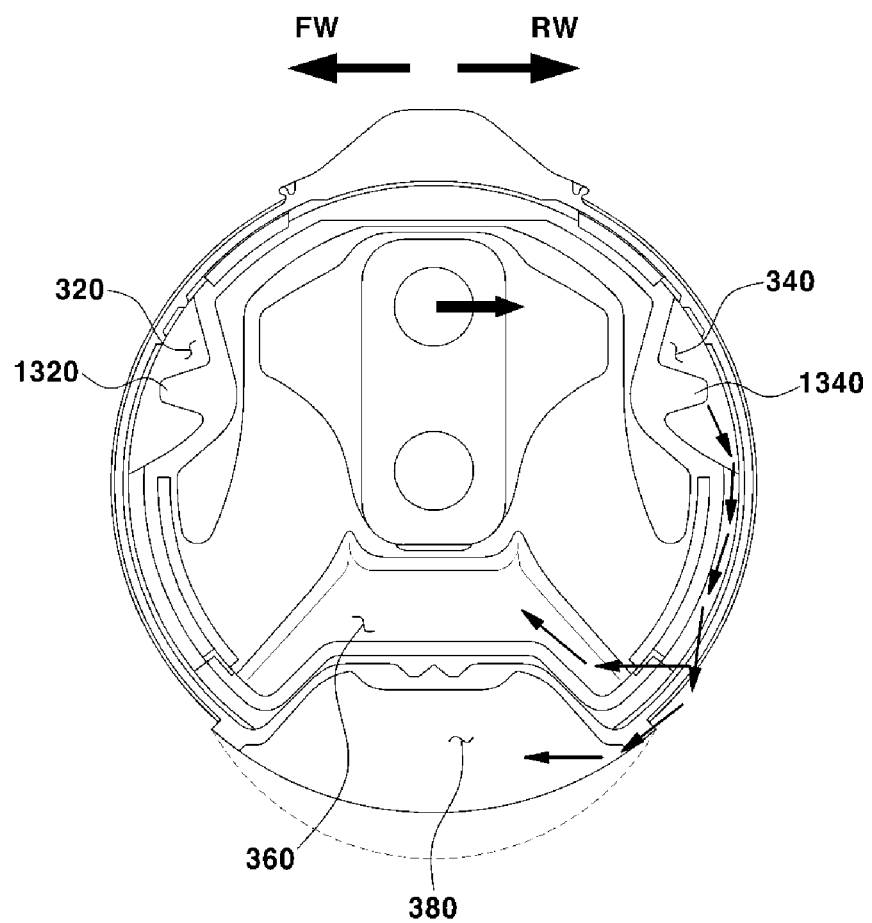

HYDRAULIC MOUNT

CROSS-REFERENCE TO RELATED APPLICATION

The application claims priority from and the benefits of Korean Patent Application No. 10-2020-0084126, filed Jul. 8, 2020 in the Korean Intellectual Property Office, which is hereby incorporated by reference in its entirety for all purposes.

TECHNICAL FIELD

The present disclosure relates to a hydraulic mount, and more particularly, to a hydraulic mount having damping functions both in the forward and rearward directions and in the upward and downward directions of a vehicle.

BACKGROUND ART

To isolate vibration, an engine mount has been using rubber due to its excellent vibration isolation performance. A hydraulic mount having damping characteristics has been introduced to control the movement of a powertrain of a vehicle during operation in addition to performing a vibration isolating function like a rubber mount.

In general, a hydraulic mount is utilized for its ability to control movement of a powertrain in the upward and downward directions, and the hydraulic mount is configured to have a structure having damping characteristics in the upward and downward directions. In an inertia support system widely applied to a front-wheel drive vehicle having a transverse powertrain, the forward and rearward directions of a mount correspond to the rotating direction of the powertrain. Thus, the vibration isolating characteristics of the mount in the forward and rearward directions are critical. For this reason, research on a dual-orifice structure for improving the vibration isolating characteristics of mounts in the forward and rearward directions is underway.

A bush-type mount having a structure having damping characteristics in the forward and rearward directions in addition to damping characteristics in the upward and downward directions has not been developed. Accordingly, such bush-type mount could not be used in a general 3-point inertia support system and has been restrictedly used only in a complex support system having a low load.

The foregoing is intended merely to aid in the understanding of the background of the present disclosure, and is not intended to mean that the present disclosure falls within the purview of the related art that is already known to those skilled in the art.

SUMMARY

The present disclosure has been made in an effort to solve the above-described problems associated with prior art.

It is an object of the present disclosure to provide a hydraulic mount having damping functions both in the forward and rearward directions and in the upward and downward directions of a vehicle for use as a transmission mount, to which a larger amount of force is applied than an engine mount, so as to improve noise, vibration and harshness (NVH) performance through damping in the forward and rearward directions, because force is intensively applied in the forward and rearward directions in an inertia support system when engine torque load is applied thereto.

The objectives of the present disclosure are not limited to the above-mentioned objectives, and other objectives not mentioned are clearly understood by those of ordinary skill in the technical field to which the present disclosure belongs from the following description.

In order to achieve the above objectives of the present disclosure as described above and perform the characteristic functions of the present disclosure to be described later, the present disclosure has features as follows.

In an aspect, a hydraulic mount according to the present disclosure comprises: an outer pipe having a diaphragm defined thereon by vulcanization; a main rubber member disposed in the outer pipe by press-fitting; a core disposed the main rubber member; a ring stopper interposed between the diaphragm and the main rubber member; a first fluid chamber and a second fluid chamber, each of which is configured by depressing both sides of an outer circumference of the main rubber member towards the core and accommodating a fluid;
a third fluid chamber configured to communicate with the first fluid chamber and the second fluid chamber, defined in a part of the main rubber member under the core, and accommodating the fluid; and a fourth fluid chamber configured to communicate with the third fluid chamber and defined between the ring stopper and the outer pipe to accommodate the fluid.

The effects of the present disclosure are not limited to those described above, and other effects not mentioned will be clearly recognized by those skilled in the art from the following description.

Other aspects and embodiments of the disclosure are discussed infra.

The above and other features of the disclosure are discussed infra.

BRIEF DESCRIPTION OF THE DRAWINGS

FIGS. 5A and 5B are views illustrating damping of the hydraulic mount according to the present disclosure in the forward and rearward directions;

DETAILED DESCRIPTION

Figure 1:
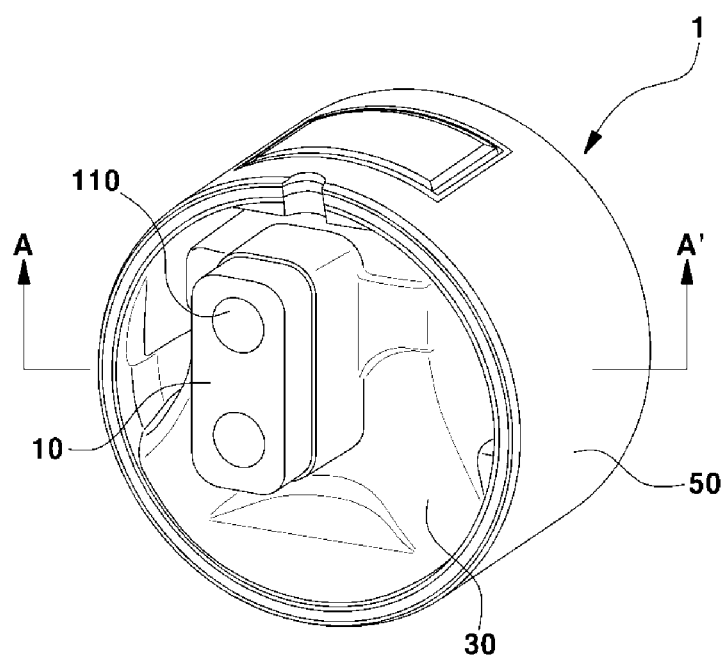
FIG. 1 is a perspective view illustrating a hydraulic mount according to the present disclosure.

Hereinafter, exemplary embodiments of the present disclosure will be described in detail with reference to the accompanying drawings. Specific structures or functions described in the embodiments of the present disclosure are merely for illustrative purposes. Embodiments according to the concept of the present disclosure may be implemented in various forms, and it should be understood that they should not be construed as being limited to the embodiments described in the present specification, but include all of modifications, equivalents, or substitutes included in the spirit and scope of the present disclosure.

It will be understood that, although the terms "first," "second," etc. may be used herein to describe various elements, these elements should not be limited by these terms. These terms are only used to distinguish one element from another element. For instance, a first element discussed below could be termed a second element without departing from the teachings of the present disclosure. Similarly, the second element could also be termed the first element.

It will be understood that when an element is referred to as being "coupled" or "connected" to another element, it can be directly coupled or connected to the other element or intervening elements may be present therebetween. In contrast, it should be understood that when an element is referred to as being "directly coupled" or "directly connected" to another element, there are no intervening elements present. Other expressions that explain the relationship between elements, such as "between," "directly between," "adjacent to," or "directly adjacent to," should be construed in the same way.

Like reference numerals denote like components throughout the specification. In the meantime, the terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise," "include," "have," etc., when used in this specification, specify the presence of stated components, steps, operations, and/or elements, but do not preclude the presence or addition of one or more other components, steps, operations, and/or elements thereof.

In general, the most widely used engine mount system is an inertia support type, but engine mounts and transmission mounts, which are mainly used, have only a damping structure in upward and downward directions. A mount having damping capability in upward and downward directions, along with forward and rearward directions, has not been introduced. Specifically, cone-type mounts are available, but bush-type mounts have not been developed. The conventional cone-type mounts require several improvements in isolation rate, costs, weight, structure, etc.

Therefore, the present disclosure aims to provide a bush-type hydraulic mount having damping performance in the forward and rearward directions.

Particularly, in the present disclosure, in order to realize the damping performance in the forward and rearward directions, an orifice structure configured to connect fluid chambers provided in the forward and rearward directions of a vehicle is applied, and a first stopper and a second stopper are provided in the forward and rearward directions, and the first and second stoppers form the fluid chambers. Further, the fluid chambers provided in the upward and downward directions of the vehicle and the fluid chambers in the forward and rearward directions of the vehicle are connected, and thus, the moving distance of a fluid during the forward and rearward movement of a powertrain becomes half the movement distance of the fluid during the upward and downward movement of the powertrain, and frequency transition is possible.

Hereinafter, the present disclosure will be described in detail with reference to the accompanying drawings.

A hydraulic mount 1 according to the present disclosure includes a core 10, an intermediate pipe 20, a main rubber member 30, a ring stopper 40, an outer pipe 50, a diaphragm 60 and a bracket 70. In general, a hydraulic mount includes fluid chambers and a diaphragm. A fluid is stored in the fluid chambers, and when the fluid chambers are pressed the fluid is supplied to the diaphragm through flow paths and is stored in the diaphragm. The hydraulic mount may damp vibration and noise through the movement of the fluid.

FIG. 1 illustrates the hydraulic mount, 1 except for the bracket 70.

As shown in FIG. 1, two or more coupling holes 110 are formed in the core 10. Bolts (not shown) coupled to the coupling holes 110 are coupled to a transmission of a vehicle and supports the load of the transmission. The core 10 may be manufactured through squeeze casting using aluminum.

Figure 7A:
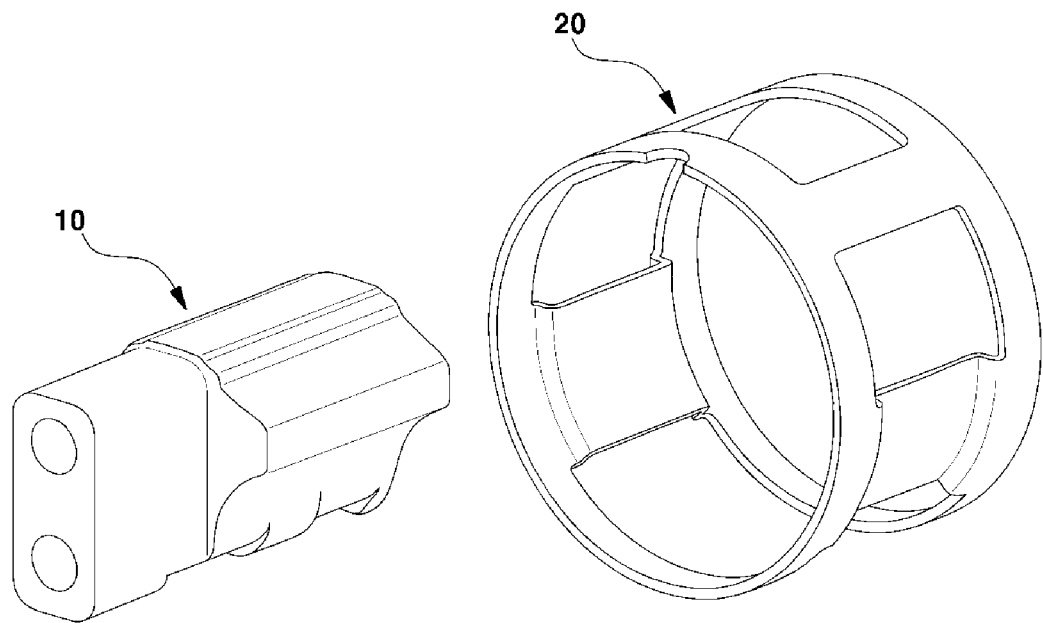
FIGS. 7A to 7H are views illustrating a process of assembling the hydraulic mount according to the present disclosure.
Figure 7B:
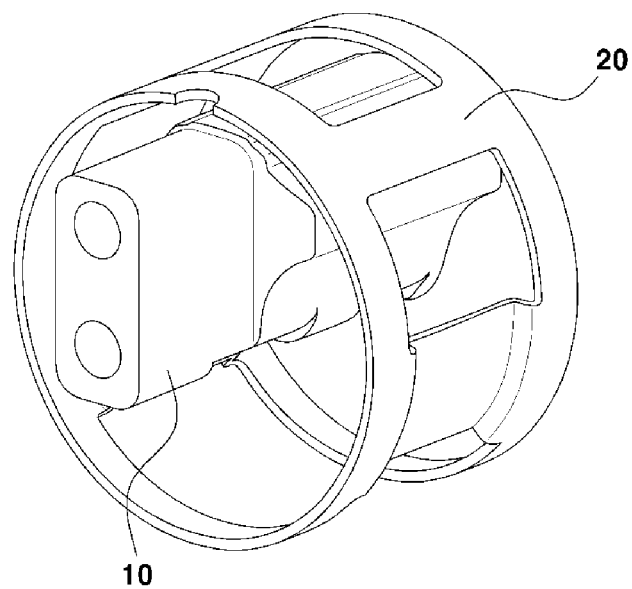
Figure 7C:
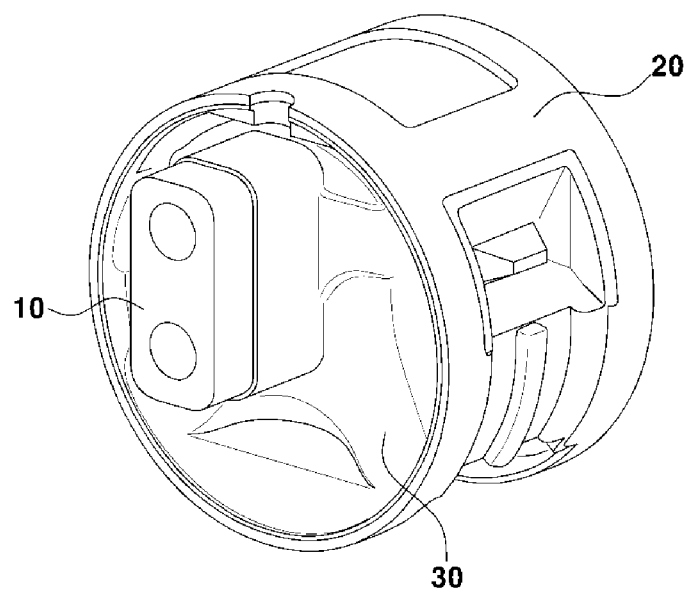

The core 10 is disposed inside the intermediate pipe 20 and is inserted into the main rubber member 30. The main rubber member 30 is inserted into the intermediate pipe 20, and the intermediate pipe 20 supports the main rubber member (as shown in FIGS. 7A to 7C).

Figure 2:
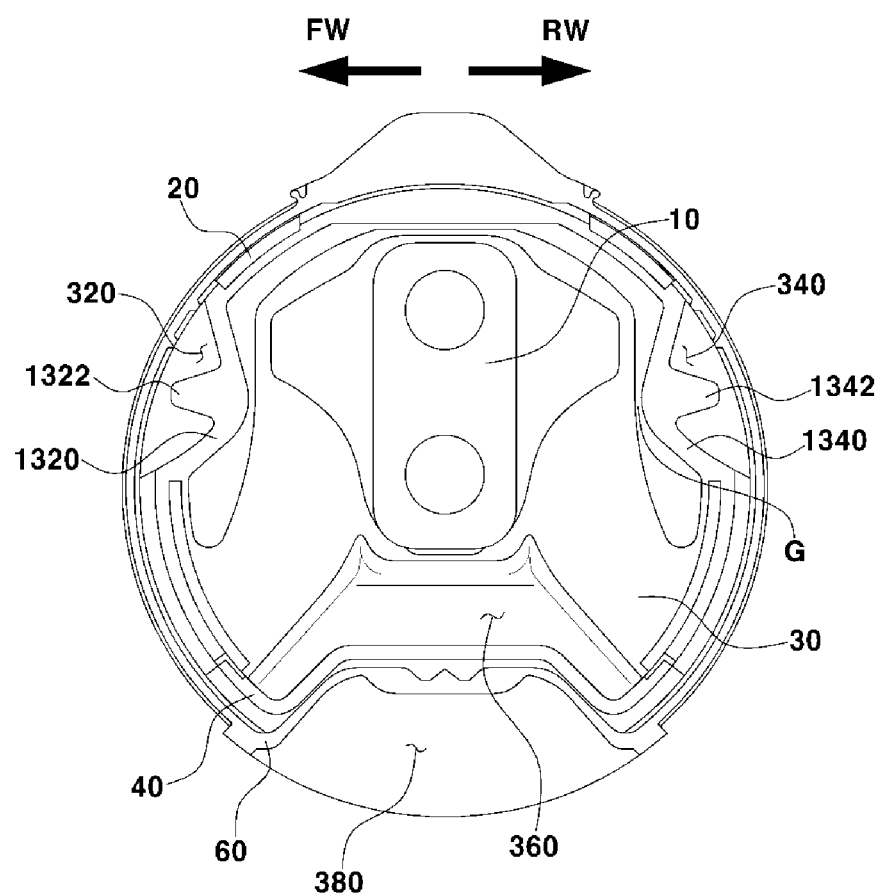
FIG. 2 is a cross-sectional view taken along line A-A' of FIG. 1.

FIG. 2 is a cross-sectional view taken along line A-A' of FIG. 1, and in FIG. 2, FW indicates a forward direction, and RW indicates a rearward direction.

Referring to FIG. 2, the hydraulic mount 1 according to the present disclosure may include a first fluid chamber 320, a second fluid chamber 340, a third fluid chamber 360 and a fourth fluid chamber 380. The first to fourth fluid chambers 320, 340, 360 and 380 are configured to communicate with each other by a fluid flowing in flow paths formed by protrusions 1322 and 1342, ridges 390 and orifices 140.

The first fluid chamber 320 and the second fluid chamber 340 are formed by depressing both sides of the outer circumference of the main rubber member 30. The first fluid chamber 320 and the second fluid chamber 340 are defined by the depressed portions of the main rubber member 30 and the outer pipe 50.

The third fluid chamber 360 is arranged below the core 10. The third fluid chamber 360 is configured to communicate with the first fluid chamber 320 and the second fluid chamber 340.

The fourth fluid chamber 380 is disposed below the third chamber 360, and a detailed description thereof will be given below.

Each side of the outer circumference of the main rubber member 30 defining the first fluid chamber 320 and the second fluid chamber 340 has a first stopper 1320 and a second stopper 1340 which are concave inwards. The first stopper 1320 and the second stopper 1340 may be formed integrally with the main rubber member 30. The first fluid chamber 320 and the second fluid chamber 340 are formed by the first stopper 1320 and the second stopper 1340.

The first stopper 1320 and the second stopper 1340 are spaced apart from the inner part of the main rubber member 30 by a designated gap G.

The protrusions 1322 and 1342, which protrude outwards, are formed at parts of the first stopper 1320 and the second stopper 1340 where the first stopper 1320 and the second stopper 1340 are recessed toward a center portion of the main rubber member 30 the most. The protrusions 1322 and 1342 perform a function of guiding the fluid in the fluid chambers 320 and 340 during damping.

According to the present disclosure, the first stopper 1320 and the second stopper 1340 provide restoring force. That is, the first fluid chamber 320 and the second fluid chamber 340 corresponding to fluid chambers for the forward and rearward directions are operated only during compression of the hydraulic mount 1, and thus, require elastic force for restoring during extension of the hydraulic mount 1 and ensure durability of a single product in the forward and rearward directions through large-displacement movement control.

Figure 3A:
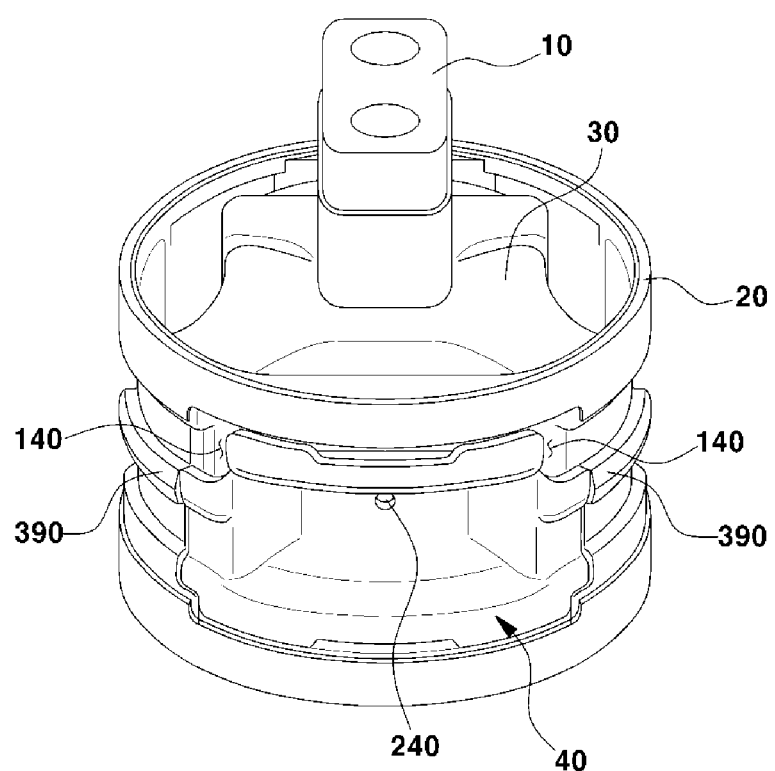
FIG. 3A is a bottom perspective view of the hydraulic mount of FIG. 1, from which an outer pipe is removed.

As shown in FIG. 3A, according to an exemplary embodiment of the present disclosure, the ridges 390 protruding from the outer circumference of the main rubber member 30 are formed in the circumferential direction thereof. One ridge 390 may be formed along the circumference of the main rubber member 30 from the end of the first fluid chamber 320 to one end of the third fluid chamber 360. Further, the first stopper 1320 and the second stopper 1340 have the same shape, more particularly, have shapes symmetrical to each other, and the other ridge 390 may be formed along the circumference of the main rubber member 30 from the end of the second fluid chamber 340 to the other end of the third fluid chamber 360. Alternatively, one ridge 390 may extend from the end of the first fluid chamber 320 to one end of the ring stopper 40, and the other ridge 390 may extend from the end of the second fluid chamber 340 to the other end of the ring stopper 40. The ridges 390 may guide movement of the fluid, together with the protrusions 1322 and 1342. The ridges 390 separate a flow path from the first fluid chamber 320 to third fluid chamber 360 and a flow path from the first fluid chamber 320 to the fourth fluid chamber 380 with each other, and separate a flow path from the second fluid chamber 340 to the third fluid chamber 360 and a flow path from the second fluid chamber 340 to the fourth fluid chamber 380.

Figure 3B:
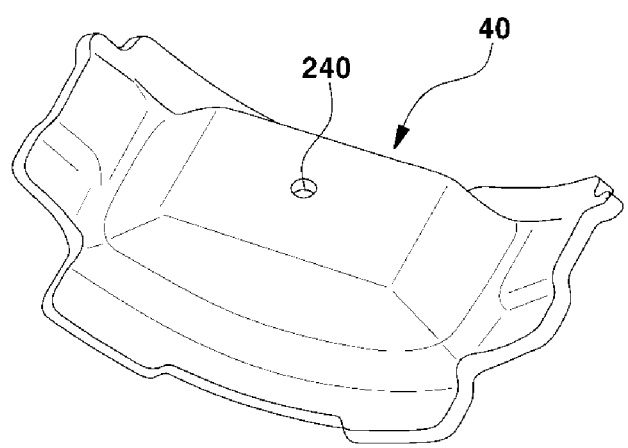
FIG. 3B is a perspective view illustrating a ring stopper for the hydraulic mount according to the present disclosure.
Figure 7D:
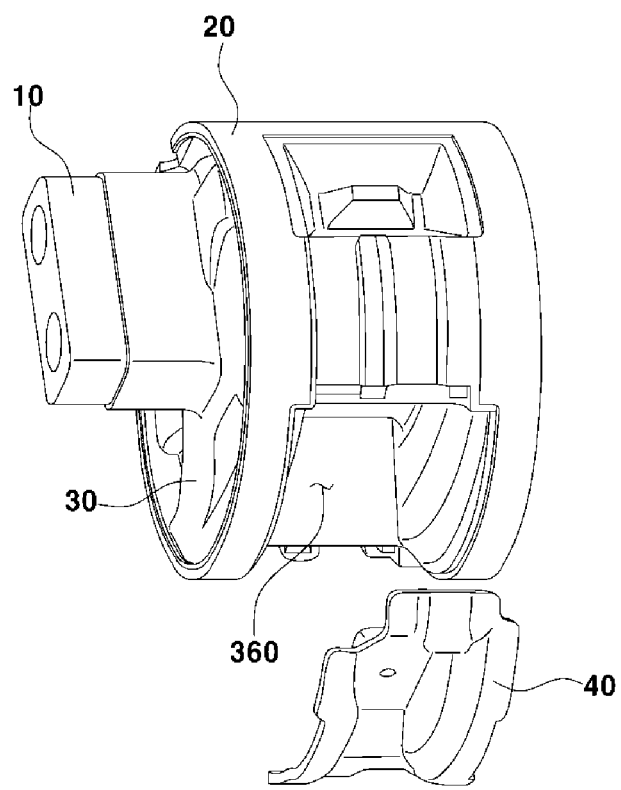
Figure 7E:
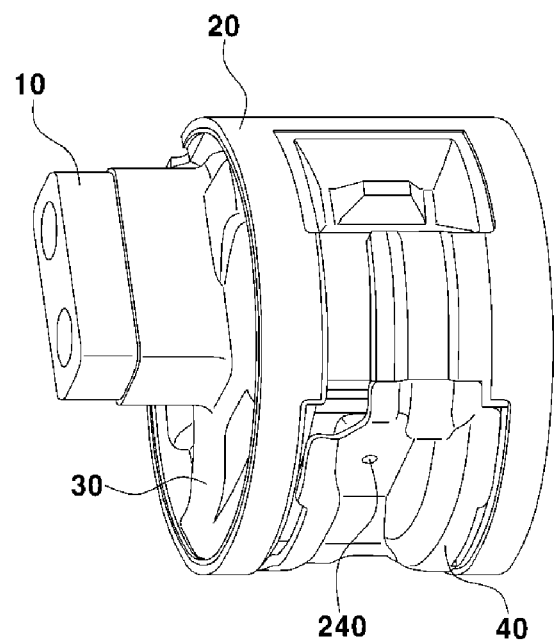

FIG. 3B illustrates the ring stopper 40. The ring stopper 40 is coupled to the main rubber member 30 (as shown in FIGS. 7D and 7E). In more detail, the ring stopper 40 is coupled to the main rubber member 30 at the third fluid chamber 360, and thus divides the third fluid chamber 360 to form the fourth fluid chamber 380. According to one exemplary embodiment of the present disclosure, the ring stopper 40 may be manufactured through pressing using steel.

The orifices 140 are formed at both ends of the ring stopper 40. The orifices 140 are configured to allow the fluid flowing from the first fluid chamber 320 and the second fluid chamber 340 to flow into the third fluid chamber 360. Alternatively, the orifices 140 may allow the fluid flowing in the third fluid chamber 360 to flow to the outside of the third fluid chamber 360.

The ring stopper 40 includes a through hole 240. The through hole 240 allows the third fluid chamber 360 and the fourth fluid chamber 380, which are separated by the ring stopper 40, to communicate with each other to exchange the fluid with each other.

That is to say, the ring stopper 40 separates the third fluid chamber 360 and the fourth fluid chamber 380, which are fluid chambers in the upward and downward directions, with each other, and has the orifices 140 formed therein. The ring stopper 40 serves as a stopper in the upward and downward directions, and the through hole 240 of the ring stopper 40 facilitates a frictional damping function and a frequency tuning function.

Figure 7F:
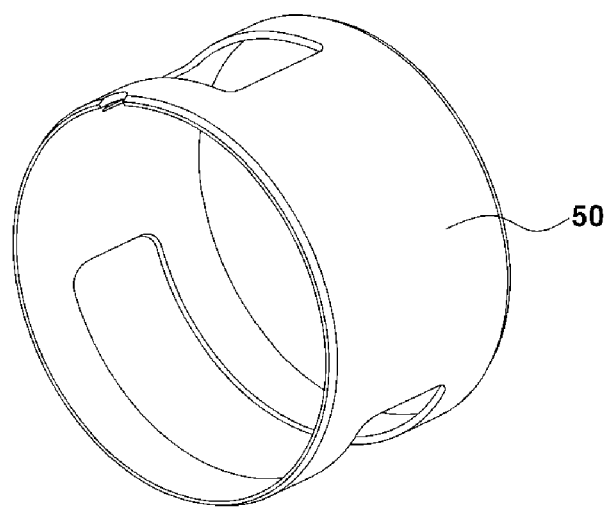
Figure 7G:
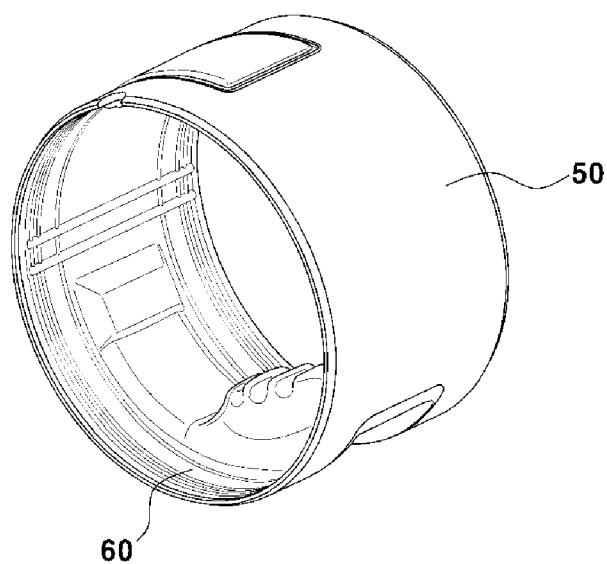
Figure 7H:
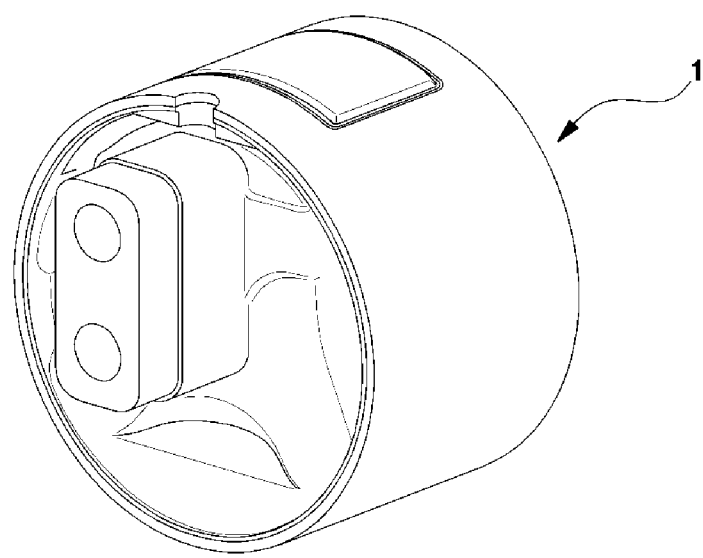

The diaphragm 60 is formed on the outer pipe 50 by vulcanization, and a space of the diaphragm 60 is formed at the lower part of the outer pipe 50 (as shown in FIGS. 7F and 7G). The outer pipe 50, on which the diaphragm 60 is formed by vulcanization, is coupled to the main rubber member 30 or the intermediate pipe 20 by press-fitting, and the ring stopper 40 is interposed between the main rubber member 30 and the diaphragm 60 (as shown in FIG. 7H). The outer pipe 50 is pressed against the intermediate pipe 20 and retains the fluid therein so that the fluid flows along the flow paths formed in the main rubber member 30.

Figure 8:
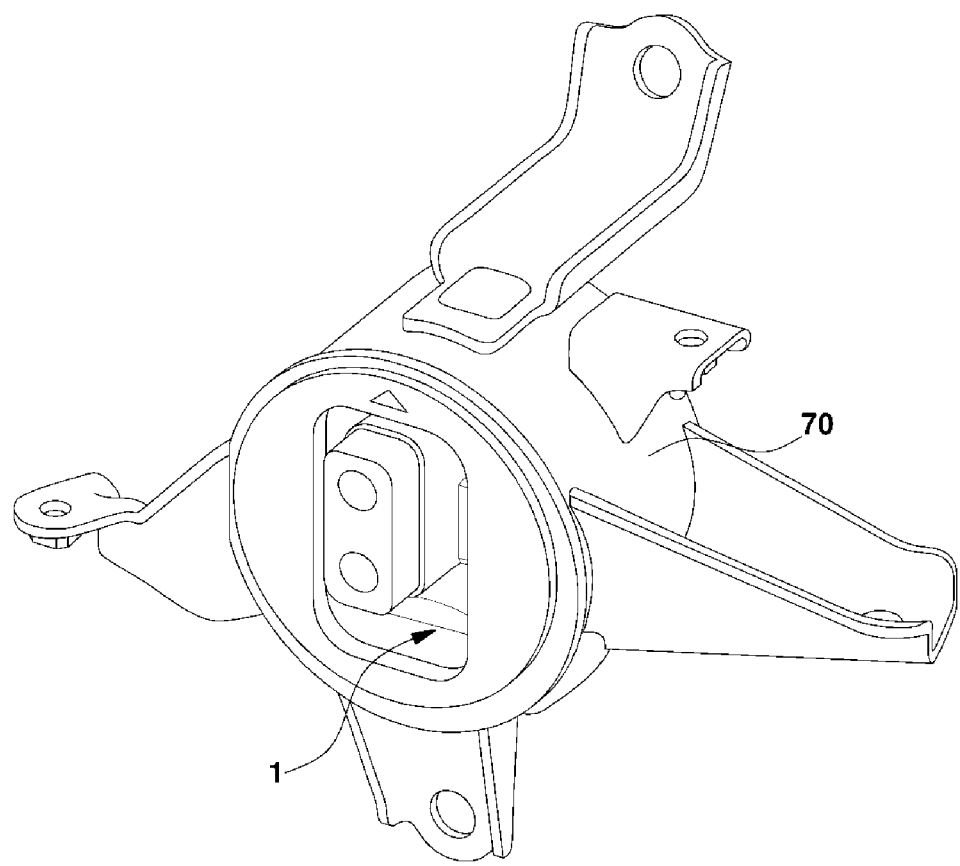
FIG. 8 is a perspective view of the hydraulic mount according to the present disclosure, on which a bracket is mounted.

Thereby, assembly of the hydraulic mount 1 is completed, and FIG. 8 illustrates the hydraulic mount 1 including the bracket 70.

Hereinafter, the operating process and the effects of the hydraulic mount 1 according to the present disclosure will be described.

Figure 4A:
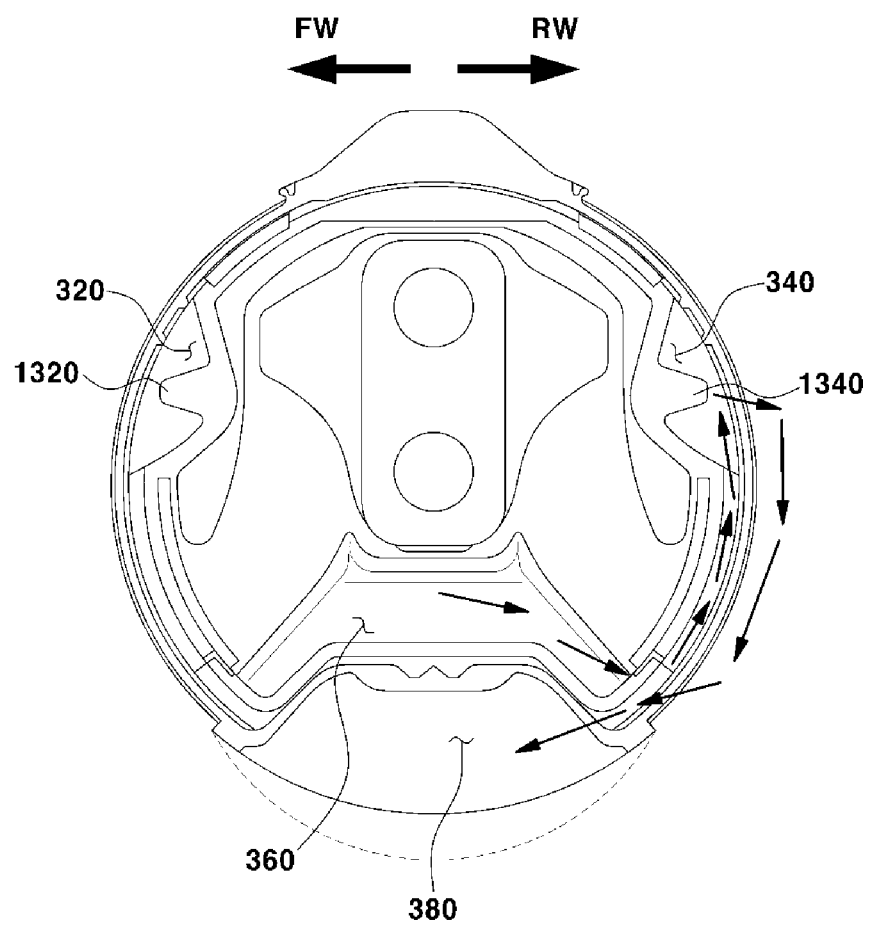
FIGS. 4A and 4B are views illustrating damping of the hydraulic mount according to the present disclosure in the upward and downward directions.
Figure 4B:
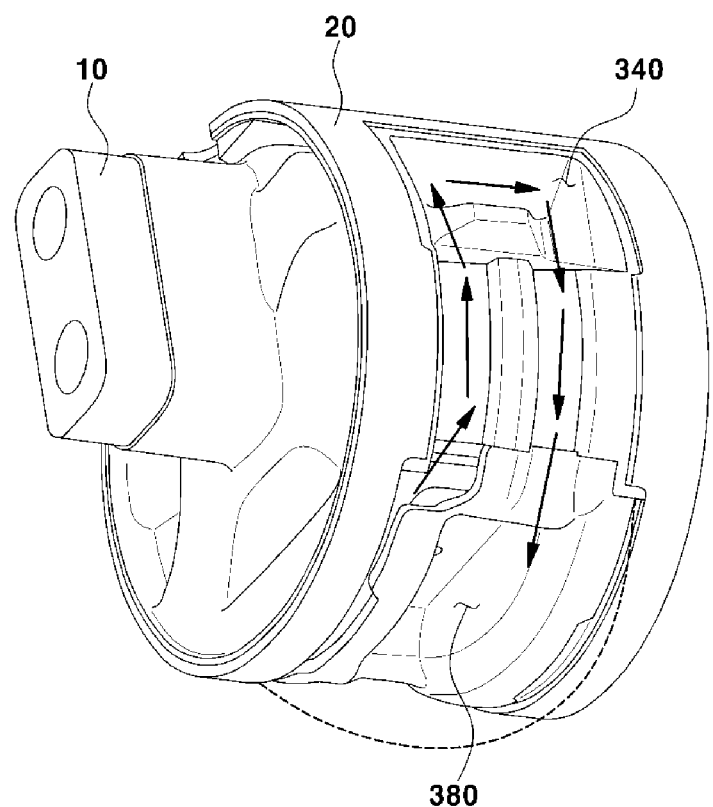

FIGS. 4A and 4B show the moving direction of the fluid when damping in the upward and downward directions is performed.

When damping in the upward and downward directions is performed, the third fluid chamber 360 is compressed and the fluid in the third fluid chamber 360 moves to the outside of the third fluid chamber 360. The fluid moving to the outside of the third fluid chamber 360 through the orifice 140 moves to the second fluid chamber 340 through the flow path at the side of the third fluid chamber 360 separated by the ridge 390, and then moves to the fourth fluid chamber 380 through the flow path at the side of the fourth fluid chamber 380 separated by the ridge 390. The diaphragm 60 expands, as shown by the dotted line in FIGS. 4A and 4B. The hydraulic mount 1 performs damping in the upward and downward directions. Further, the same process is applied to the first fluid chamber 320, and a description thereof will thus be omitted.

The fluid from the third fluid chamber 360 flows to the fourth fluid chamber 380 without expanding the first fluid chamber 320 or the second fluid chamber 340 during movement of a powertrain in the upward and downward directions. This is because the thickness of the portions of the main rubber member 340 defining the first fluid chamber 320 and the second fluid chamber 340 is greater than the thickness of the diaphragm 60 forming the fourth fluid chamber 380. For example, the portions of the main rubber member 340 forming the first fluid chamber 320 and the second fluid chamber 340 may have a thickness of about 4 to 5 mm and be provided with the protrusions 1322 and 1342, whereas the diaphragm 60 may have a thickness of about 2 mm, and so the fluid from the third fluid chamber 360 may move to the fourth fluid chamber 380 and expand the diaphragm 60.

Figure 5B:
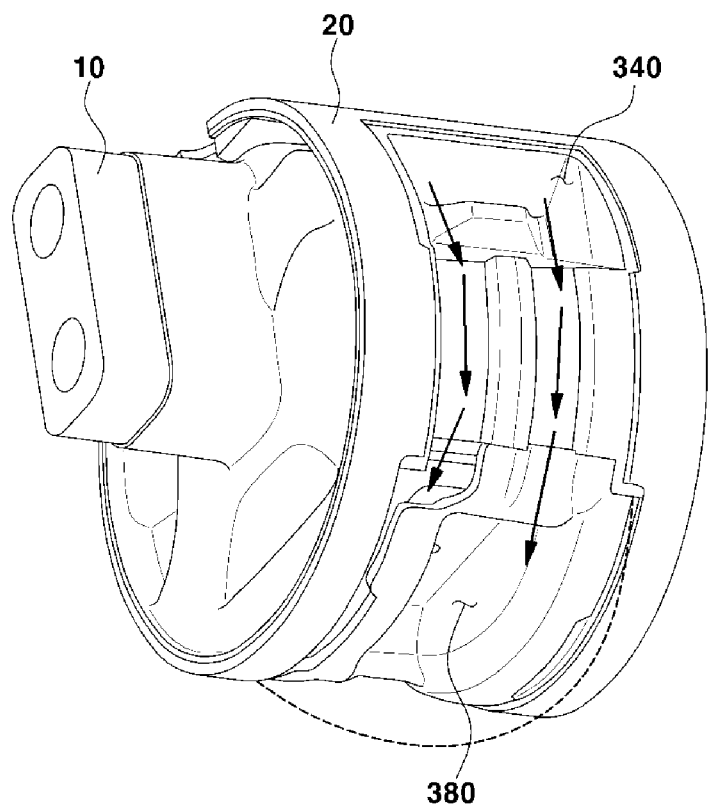

FIGS. 5A and 5B show the moving direction of the fluid when damping in the forward and rearward directions is performed. When the vehicle is driven in a D (drive) mode, that is, when damping in the rearward direction is performed, the second fluid chamber 340 is compressed, and the fluid flows in both sides of the ridge 390 along the outer circumference of the main rubber member 30 and then flows toward the third fluid chamber 360 and the fourth fluid chamber 380, respectively, thereby performing the damping function. The diaphragm 60 expands, as noted by the dotted line in FIGS. 5A and 5B. In general, since the diaphragm 60 does not have resistance the fluid moves mainly to the fourth fluid chamber 380 rather than the third fluid chamber 360.

When damping in the forward direction is performed, that is, when the vehicle is driven in an R (reverse) mode, the first fluid chamber 320 is compressed, and the fluid flows towards the third fluid chamber 360 and the fourth fluid chamber 380, thereby performing the damping function. The damping operation in the forward direction is similar to the above-described damping operation in the rearward direction, and a detailed description thereof will be omitted.

Here, the length of a fluid movement path when the hydraulic mount 1 is compressed in the forward or rearward direction is ½ of the length of a fluid movement path when the hydraulic mount 1 is compressed in the upward and downward directions. That is, when the hydraulic mount 1 is compressed in the upward and downward direction, the fluid flows along a path of the third fluid chamber 360, the second fluid chamber 340 and the fourth fluid chamber 360, and when the hydraulic mount 1 is compressed in the forward or rearward directions, the fluid flows along a path of the second fluid chamber 340 and the third or fourth fluid chamber 360 or 380.

Figure 6A:
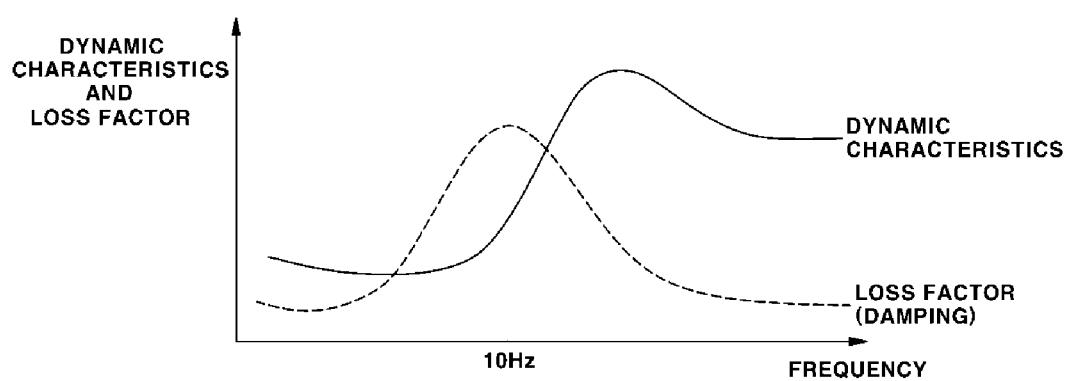
FIG. 6A is a graph representing dynamic characteristics and a loss factor depending on frequency when the hydraulic mount according to the present disclosure performs damping in the upward and downward directions.
Figure 6B:
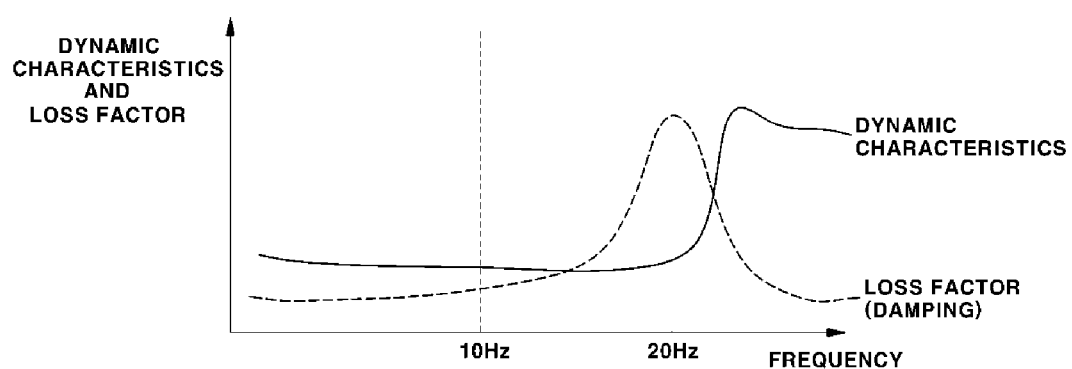
FIG. 6B is a graph representing dynamic characteristics and a loss factor depending on frequency when the hydraulic mount according to the present disclosure performs damping in the forward and rearward directions.

Referring to FIGS. 6A and 6B, the length of the flow path of the fluid when damping in the forward and rearward directions is performed is about ½ of the length of the flow path of the fluid when damping in the upward and downward directions is performed, and thus, a damping frequency when damping in the forward and rearward directions is performed is about twice a damping frequency when damping in the upward and downward directions is performed. The damping frequency when damping in the upward and downward directions is performed is generally about 10 Hz in a powertrain bounce mode and the damping frequency when damping in the forward and rearward directions is performed is about doubled due to the configuration of the flow path, thereby improving an isolation rate due to increase in the damping frequency and decrease in dynamic characteristics.

In damping in the forward and rearward directions is performed, the core 10 moves and the fluid flows to the fourth fluid chamber 380 only when the first fluid chamber 320 or the second fluid chamber 340 is compressed. That is, the gap G between the main rubber member 30 and the first stopper 1320 or between the main rubber member 30 and the second stopper 1340 is kept to be a minimum size (i.e., a minimum size of 1.5 mm into which a mold pin may be inserted). In general, when the vehicle is driven in the D mode, the gap G becomes 1.5 mm or more, and the damping effect and the dynamic characteristic lowering effect due to the fluid chambers may be acquired during idling.

In addition, the gap G between the inner part of the main rubber member 30 and the first stopper 1320 or between the inner part of the main rubber member 30 and the second stopper 1340 is provided due to strong tension acting on the main rubber 30. The main rubber 30 tends to sag when mounted in the vehicle as about 7 mm of sagging was found to occur. Then the inner part of the main rubber member 30 sinks, whereas as the first stopper 1320 and the second stopper 1340 stays in their respective original positions, which generates strong tension. If no gap is provided, that is if the inner part of the main rubber member 30 and the first stopper 1320 or the second stopper 1340 is connected, the rubber may be torn and required durability may not be achieved. Accordingly, the fluid moves only during compression and restoration may be achieved by the first stopper 1320 and the second stopper 1340.

As is apparent from the above description, the present disclosure provides a hydraulic mount which provides damping functions both in the forward and rearward directions and in the upward and downward directions of a vehicle so as to simultaneously harmoniously satisfy both NVH performance and ride and handling (R&H) performance, between which there is conventionally a tradeoff, in an inertia support system.

The hydraulic mount according to the present disclosure provides the damping functions both in the forward and rearward directions and in the upward and downward directions and requires no additional parts, thereby being capable of achieving cost reduction.

Further, the hydraulic mount according to the present disclosure may isolate not only vibration when an engine starts but also large displacement vibration, such as startup shock.

In addition, the hydraulic mount according to the present disclosure has a structure, which provides the damping functions both in the forward and rearward directions and in the upward and downward directions, within an insulator, thus being freely applicable without affecting the layout of peripheral systems.

It should be understood that the present disclosure is not limited to the above described embodiments and the accompanying drawings, and various substitutions, modifications, and alterations can be devised by those skilled in the art without departing from the technical spirit of the present disclosure.

What is claimed is:

1. A hydraulic mount comprising:
   an outer pipe having a diaphragm defined thereon by vulcanization;
   a main rubber member disposed in the outer pipe by press-fitting;
   a core disposed inside the main rubber member;
   a ring stopper interposed between the diaphragm and the main rubber member;
   a first fluid chamber and a second fluid chamber configured by depressing both sides of an outer circumference of the main rubber member towards the core, each of the first and second fluid chambers configured to accommodate a fluid;
   a third fluid chamber configured to communicate with the first fluid chamber and the second fluid chamber, defined in a part of the main rubber member under the core, and accommodating the fluid; and
   a fourth fluid chamber configured to communicate with the third fluid chamber and defined between the ring stopper and the outer pipe to accommodate the fluid.

2. The hydraulic mount of claim 1, wherein sides of the outer circumference of the main rubber member includes a first stopper and a second stopper, respectively, and
   wherein each of the first and second stoppers is configured to be concave inwards and spaced apart from an inner part of the main rubber member by a designated gap.

3. The hydraulic mount of claim 1, wherein the ring stopper comprises a through hole configured to directly communicate with the third fluid chamber.

4. The hydraulic mount of claim 2, wherein the first stopper and the second stopper include protrusions, and
   wherein each protrusion protrudes from a concave surface of the first stopper and the second stopper, respectively.

5. The hydraulic mount of claim 1, wherein orifices are arranged at both ends of the ring stopper,
   wherein the third fluid chamber and the first fluid chamber are configured to be in fluid communication with each other through one of the orifices, and
   wherein the third fluid chamber and the second fluid chamber are configured to be in fluid communication with each other through the other one of the orifices.

6. The hydraulic mount of claim 5, wherein the main rubber member includes a first ridge protruding on the outer circumference of the main rubber member and extending from one end of the first fluid chamber to one end of the ring stopper, and wherein the first ridge is configured to divide a flow path from the first fluid chamber into a first flow path and a second flow path, the first flow path leading to the third fluid chamber and the second flow path leading to the fourth fluid chamber.

7. The hydraulic mount of claim 6, wherein the main rubber member includes a second ridge protruding on the outer circumference of the main rubber member and extending from one end of the second fluid chamber to the other end of the ring stopper, and wherein the second ridge is configured to divide a flow path from the second fluid chamber into a third flow path and a fourth flow path, the third flow path leading to the third fluid chamber and the fourth flow path leading to the fourth fluid chamber.

8. The hydraulic mount of claim 1, wherein each thickness of both sides of the outer circumference of the main rubber member is greater than a thickness of the diaphragm forming the fourth fluid chamber.

9. The hydraulic mount of claim 1, wherein the fluid in the third fluid chamber flows to the fourth fluid chamber during damping in an upward and downward direction.

10. The hydraulic mount of claim 9, wherein, during damping in upward and downward directions, a portion of the fluid in the third fluid chamber flows to the fourth fluid chamber via the first fluid chamber and a remaining portion of the fluid in the third fluid chamber flows to the fourth fluid chamber via the second fluid chamber.

11. The hydraulic mount of claim 1, wherein, during damping in a forward direction, the first fluid chamber is compressed and the fluid in the first fluid chamber flows to the third fluid chamber and the fourth fluid chamber.

12. The hydraulic mount of claim 1, wherein, during damping in a rearward direction, the second fluid chamber is compressed and the fluid in the second fluid chamber flows to the third fluid chamber and the fourth fluid chamber.

13. The hydraulic mount of claim 2, wherein, during damping in a forward direction, the first fluid chamber is compressed and the compressed first fluid chamber is restored to an original position of the first fluid chamber by restoring force of the first stopper.

14. The hydraulic mount of claim 2, wherein, during damping in a rearward direction, the second fluid chamber is compressed and the compressed second fluid chamber is restored to an original position of the second fluid chamber by restoring force of the second stopper.

15. The hydraulic mount of claim 6, wherein, during damping in upward and downward directions, a portion of the fluid in the third fluid chamber flows to the first flow chamber through the first flow path and then flows to the fourth fluid chamber through the second flow path to the fourth fluid chamber.

16. The hydraulic mount of claim 7, wherein, during damping in upward and downward directions, a portion of the fluid in the third fluid chamber flows to the second flow chamber through the third flow path and then flows to the fourth fluid chamber along the fourth flow path.

17. The hydraulic mount of claim 6, wherein, during damping in a forward direction, the fluid in the first fluid chamber is compressed and a portion of the fluid in the first fluid chamber moves to the third fluid chamber through the first flow path and a remaining portion of the fluid in the first fluid chamber moves to the fourth fluid chamber through the second flow path.

18. The hydraulic mount of claim 7, wherein, during damping in a rearward direction, the fluid in the second fluid chamber is compressed and a portion of the fluid in the second fluid chamber moves to the third fluid chamber through the third flow path and a remaining portion of the fluid in the second fluid chamber moves to the fourth fluid chamber through the fourth flow path.

* * * * *